United States Patent
Matousek et al.

(10) Patent No.: US 7,175,520 B2
(45) Date of Patent: Feb. 13, 2007

(54) CAB ARRANGEMENT FOR HARVESTING COMBINE

(75) Inventors: Robert A. Matousek, Milan, IL (US); Jonathon E. Ricketts, Viola, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/619,972

(22) Filed: Jul. 15, 2003

(65) Prior Publication Data

US 2005/0020334 A1    Jan. 27, 2005

(51) Int. Cl.
*A01F 7/00* (2006.01)

(52) U.S. Cl. .................. 460/150; 460/119; 180/89.13; 296/190.04; 296/190.05

(58) Field of Classification Search .................. 56/100; 460/66, 119, 150; 180/89.12, 89.13, 89.14, 180/89.15; 296/190.04, 190.05, 190.06, 296/190.07, 190.08
See application file for complete search history.

(56) References Cited

U.S. PATENT DOCUMENTS

| | | | | |
|---|---|---|---|---|
| 3,484,802 A | * | 12/1969 | Reece et al. | 56/13.3 |
| 3,568,418 A | * | 3/1971 | Copley et al. | 56/13.5 |
| 3,714,767 A | * | 2/1973 | Hubbard et al. | 56/208 |
| 3,737,192 A | | 6/1973 | Hirsch | 296/28 C |
| 4,067,264 A | * | 1/1978 | Ensink | 105/456 |
| 4,170,098 A | * | 10/1979 | Moreno et al. | 56/13.9 |
| 4,209,024 A | * | 6/1980 | Powell et al. | 460/70 |
| 4,241,653 A | * | 12/1980 | Fagundes et al. | 100/100 |
| 4,338,770 A | * | 7/1982 | Schlueter | 56/33 |
| 4,421,188 A | | 12/1983 | Fredriksen | 180/327 |
| 4,427,090 A | | 1/1984 | Fredriksen | 180/327 |
| 4,480,397 A | * | 11/1984 | Vachon | 37/234 |
| 4,605,259 A | | 8/1986 | Hurlburt | 296/190 |
| 4,722,173 A | * | 2/1988 | Covington et al. | 56/15.9 |
| 5,176,573 A | * | 1/1993 | Dow | 460/42 |
| 5,584,762 A | | 12/1996 | Buhler | 460/119 |
| 5,595,537 A | | 1/1997 | Jungemann | 460/100 |
| 5,906,411 A | * | 5/1999 | Stauffer et al. | 296/190.11 |
| 6,632,135 B2 | * | 10/2003 | Matousek et al. | 460/23 |
| 6,705,067 B2 | * | 3/2004 | Schroeder et al. | 56/14.6 |
| 6,875,103 B2 | * | 4/2005 | Matousek et al. | 460/150 |

* cited by examiner

*Primary Examiner*—Thomas B. Will
*Assistant Examiner*—Alicia Torres
(74) *Attorney, Agent, or Firm*—Michael G. Harms; John William Stader; Stephen A. Bucchianeri

(57) ABSTRACT

A cab arrangement for a harvesting combine includes a harvesting combine having a body and a cab spaced-apart from the body. A platform is positioned between the cab and the body. The cab, the boy, and the platform define a passageway to allow an operator to visually monitor and access the body from the platform.

18 Claims, 11 Drawing Sheets

CAB ARRANGEMENT FOR HARVESTING COMBINE

FIELD OF THE INVENTION

The present invention relates generally to the field of agricultural crop harvesters. It relates particularly to agricultural crop harvesters such as combines and, more specifically, to a cab arrangement for a combine.

BACKGROUND OF THE INVENTION

Modern harvesting combines are generally equipped with an enclosed operator's cab in which the operator is seated to control the harvesting operation of the machine. Operator cabs are typically mounted at an elevated position on the front of the combine and include glass panels around the front and sides of the cab to afford the operator with a field of view of the crop being harvested and the header of the combine. The back wall of the cab is typically located against or adjacent to the grain tank which is located directly behind the cab. As a result, there is typically no window provided in the back wall of the cab. The disadvantage of this arrangement is that the operator's field of view of both the field and the operating equipment behind the cab is substantially reduced. Moreover, the close proximity of the back wall of the cab to the grain tank makes it difficult for an operator to access or visually monitor the operation of the components of the combine that are positioned behind the cab.

Accordingly, it would be desired to have cab arrangement for a harvesting combine that overcomes the disadvantages described above.

SUMMARY OF THE INVENTION

One aspect of the invention provides a cab arrangement for a harvesting combine. A harvesting combine includes a body and a cab spaced-apart from the body. The body may preferably include a housing and operating equipment. The operating equipment may include a loop elevator assembly, a grain tank, a rotary threshing assembly including a rotor, and a cleaning system including a chaffer sieve and a shoe sieve. The cab may preferably include a back wall having a transparent window to provide the operator with enhanced visibility behind the cab. The transparent window may preferably be comprised of glass. The cab may also preferably include first and second side walls. The first side wall of the cab may preferably include a first transparent panel and the second side wall of the cab may preferably include a second transparent panel. The first and second transparent panels may preferably be comprised of glass. The cab may also preferably include a curved transparent front panel comprised of glass. A platform is positioned between the cab and the body. The cab, the body, and the platform define a passageway to allow an operator to visually monitor and access the body from the platform. The platform may preferably include a first side portion, a second side portion, and a back portion. The back portion may be positioned between the cab and the body. The back portion may be preferably have a width of approximately 18–20 inches and the passageway may also preferably have a width of approximately 18–20 inches. The platform may preferably extend substantially around the back wall and the first and second side walls of the cab. The platform may preferably include a railing extending upward from the platform and along an outer perimeter of the platform. The combine may include a frame and the platform may be attached to the frame. The platform may preferably be positioned above front wheels of the combine.

Another aspect of the invention provides a method for visually monitoring a harvesting combine. A harvesting combine having a body including a housing and operating equipment is provided. A cab spaced-apart from the body is also provided. A platform is positioned between the cab and the body. The cab, the body, and the platform define a passageway. The operating equipment of the combine is visually monitored from the platform.

Another aspect of the invention provides a method for accessing a harvesting combine. A harvesting combine having a body including a housing and operating equipment is provided. A cab spaced-apart from the body is also provided. A platform is positioned between the cab and the body. The cab, the body, and the platform define a passageway. The operating equipment is accessed from the platform. The cab may preferably include a back wall having a transparent window. The operating equipment of the combine is visually monitored from the cab. The transparent window may preferably be comprised of glass.

Another aspect of the invention provides a cab arrangement for a harvesting combine. A harvesting combine includes a body having a grain tank. A cab is spaced-apart from the grain tank, and a platform positioned between the cab and the grain tank. The cab, the grain tank, and the platform define a passageway to allow an operator to access the platform and visually monitor operating equipment of the combine from the platform.

The invention provides the foregoing and other features, and the advantages of the invention will become further apparent from the following detailed description of the presently preferred embodiments, read in conjunction with accompanying drawings. The detailed description and drawings are merely illustrative of the invention and do not limit the scope o the invention, which is defined by the appended claims and equivalents thereof.

DETAILED DESCRIPTION OF A PREFERRED EMBODIMENT

Figure 1:
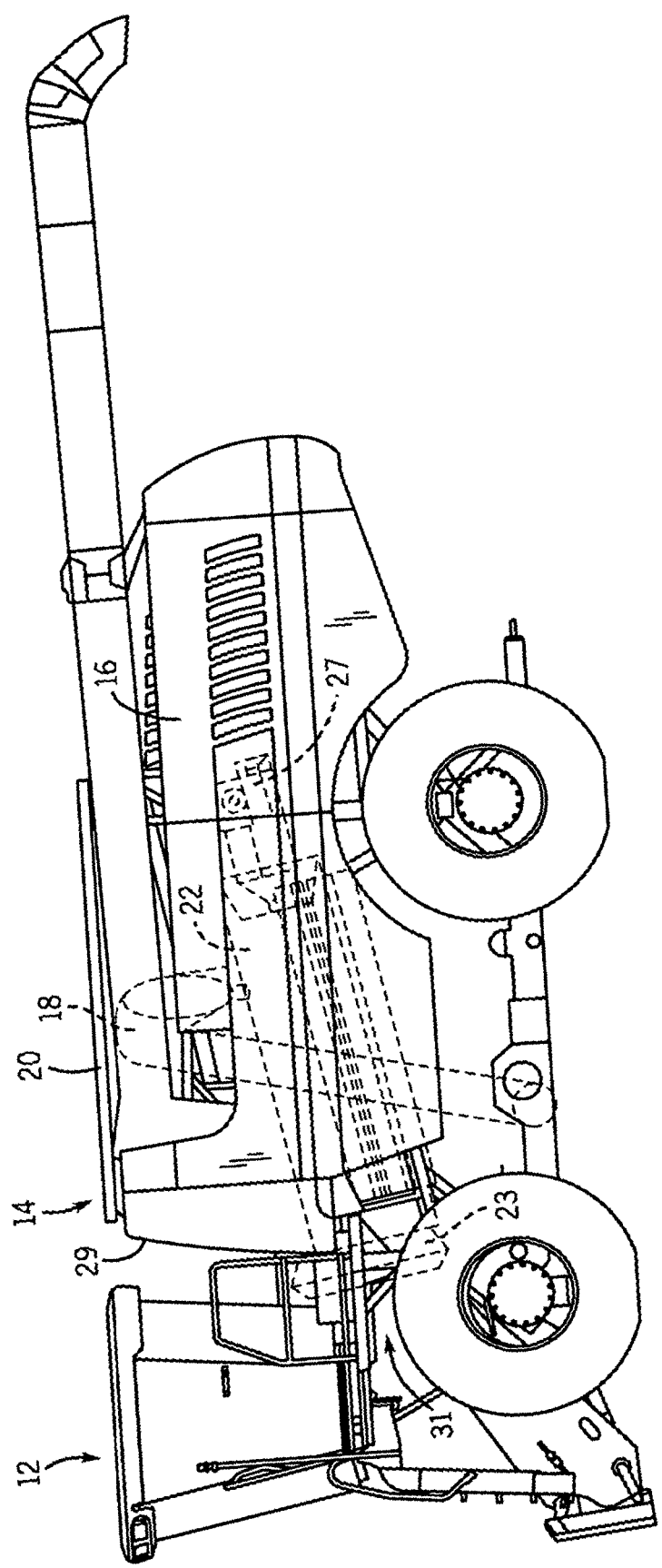
FIG. 1 is a side view of the preferred embodiment of a cab arrangement for a harvesting combine, which is made in accordance with the invention.

Referring to the drawings, and particularly to FIG. 1, a preferred embodiment of a cab arrangement for a self-propelled harvesting combine 10 is provided. The combine 10 is capable of harvesting crops such as, for example, corn, soybeans, and wheat. In the embodiment shown, the combine 10 includes an operator cab 12 and a body 14. The body 14 may preferably include a housing 16 and various operating equipment such as, for example, a loop elevator assembly 18, a grain tank 20, a rotary threshing assembly including a rotor 22, and a cleaning system including a chaffer sieve and a shoe sieve (not shown). The chaffer sieve and the shoe sieve are preferably located below the rotor 22. The rotor 22 preferably includes a front end 23 and a back end 27. The front end 23 of the rotor 22 is located adjacent a front wall 29 of the housing 16 and the back end 27 extends upward from the front end 23 of the rotor 22. As shown in FIG. 1, the body 14 of the combine 10 is generally located behind the cab 12. Referring to FIG. 2–5, the cab 12 may preferably include a first side wall 26 (see FIG. 2) and a second side wall 28 (see FIG. 3) opposite the first side wall 26. The first side wall 26 of the cab 12 may preferably include a first transparent panel 30 and the second side wall 28 may preferably include a second transparent panel 32. The first and second transparent panels 30, 32 each may be comprised of glass. The cab 12 may also include a front curves transparent panel 34. The front curved transparent panel 34 may also preferably be comprised of glass.

Figure 2:
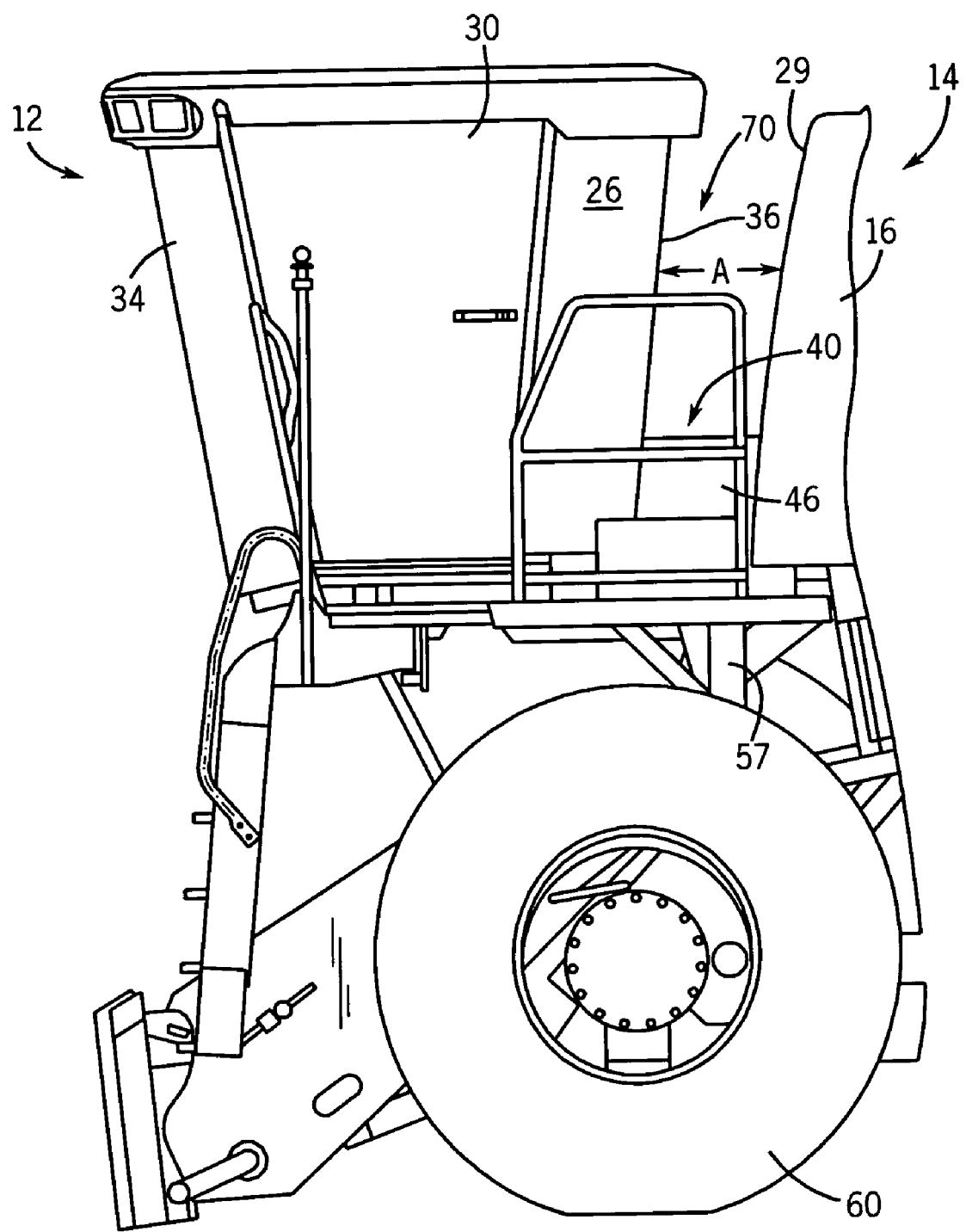
FIG. 2 is an enlarged partial side view of the embodiment of FIG. 1 showing the cab in the down position.
Figure 3:
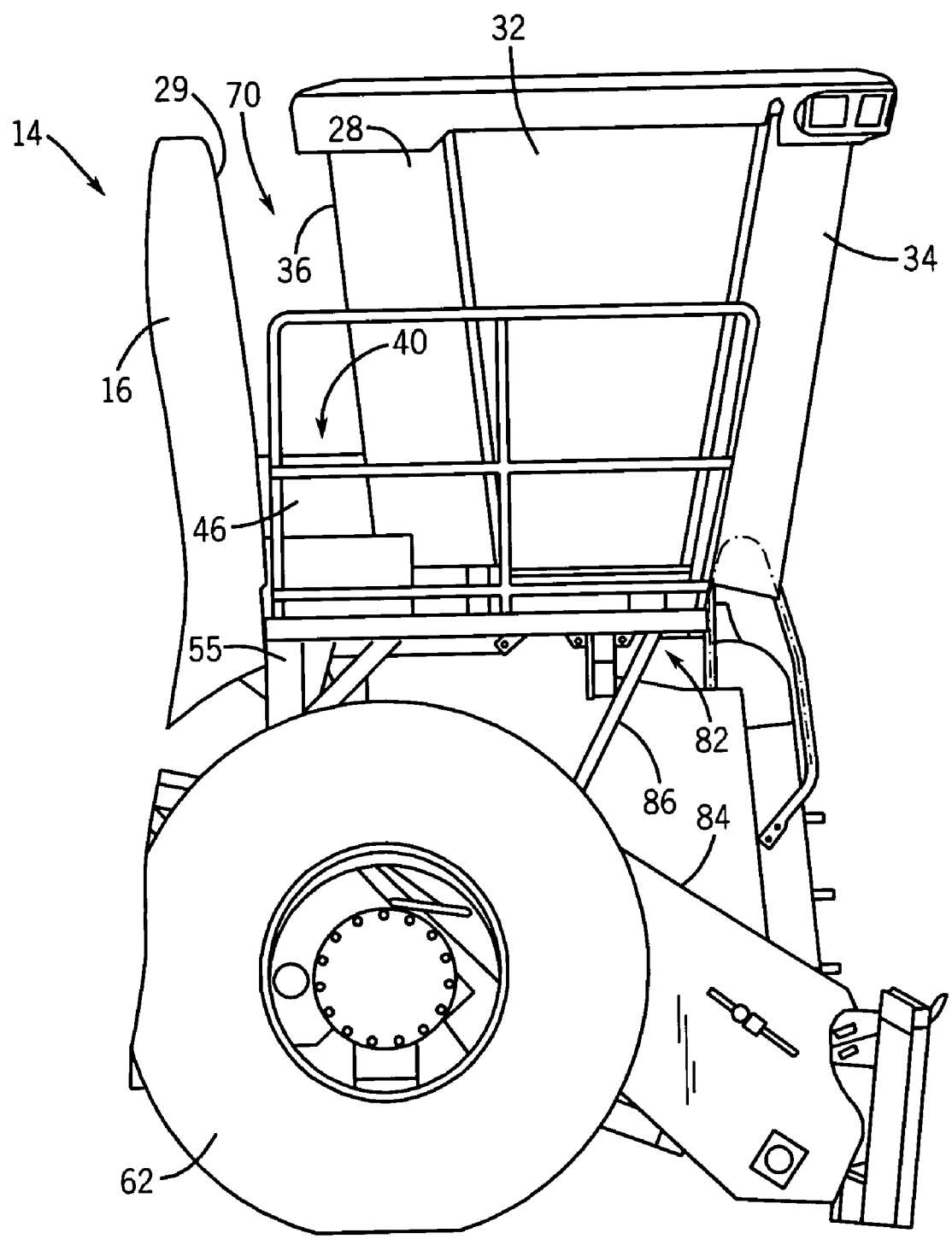
FIG. 3 is an enlarged partial side view of the embodiment of FIG. 1 showing the right side of the cab.
Figure 4:
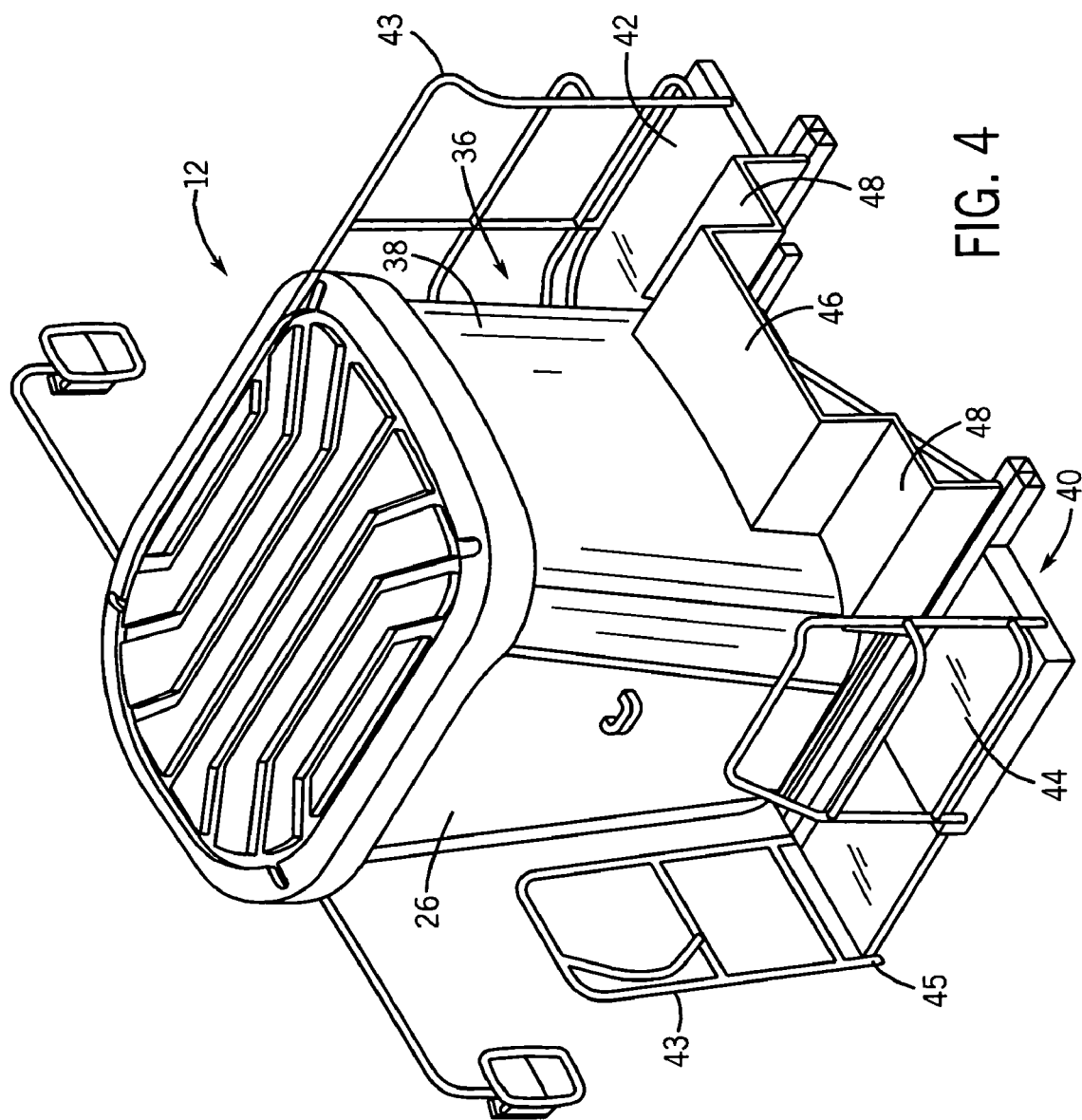
FIG. 4 is an enlarged partial perspective view of the embodiment of FIG. 1 showing the back wall of the cab.
Figure 5:
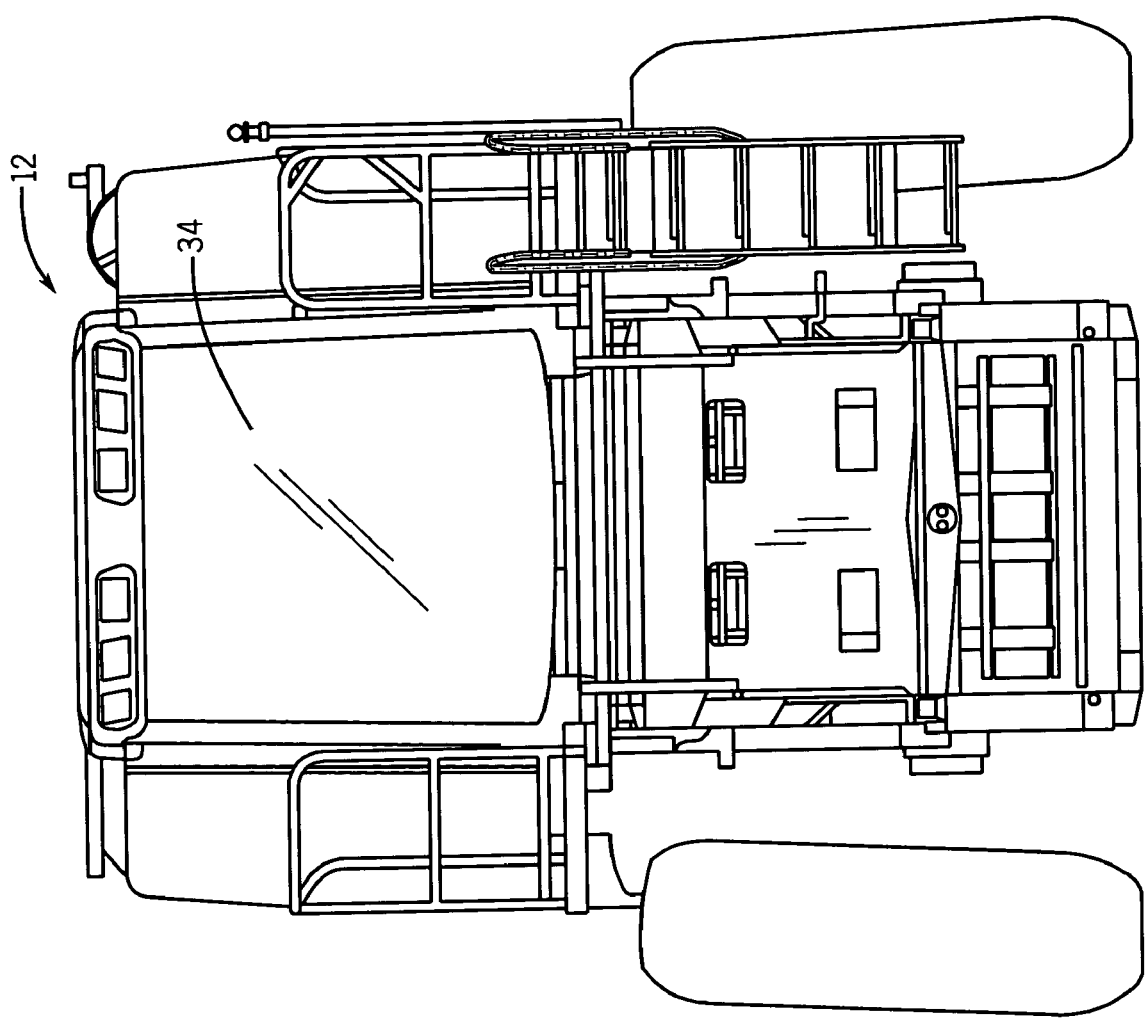
FIG. 5 is an enlarged front view of the embodiment of FIG. 1.

As shown in FIG. 1–3, the cab 12 is spaced-apart from the body 14 of the combine 10. As shown in FIG. 4, the cab 12 includes a back wall 36 that preferably includes a transparent window 38 that provides an operator seated in the cab 12 with enhanced visibility behind the cab 12. In the embodiment shown, the transparent window 38, together with the first and second transparent panels 30, 32 and the front curved transparent panel 34, provides substantially 360-degree visibility from the cab 12. The transparent window 38 may preferably be comprised of glass. One advantage of the spaced location of the cab 12 relative to the body 14 is that it provides ample distance between the cab 12 and the body 12 to provide an operator with enhanced visibility throughout transparent window 38 of both the field and various operating equipment located behind the cab 12. Also, the spaced location of the cab 12 relative to the body portion 14 of the combine 10 provides improved aesthetics for the combine 10.

Figure 6:
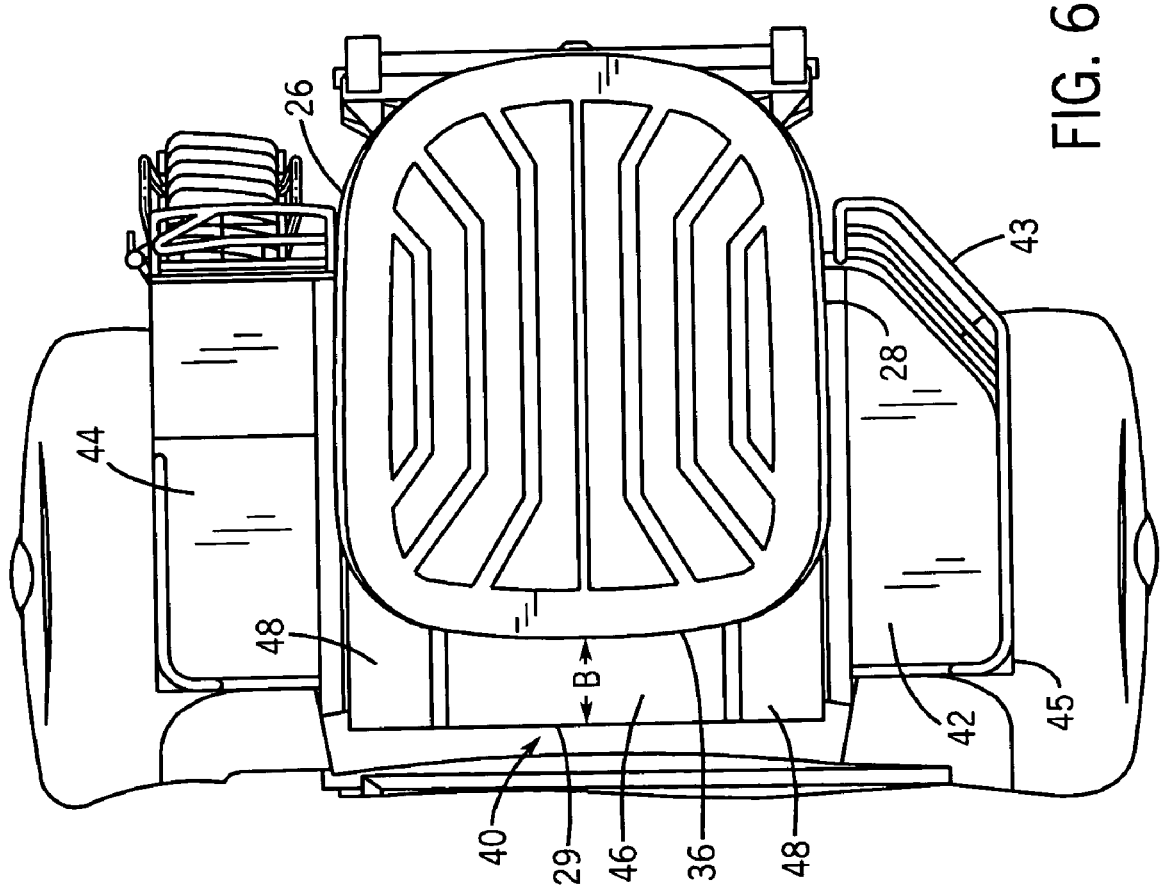
FIG. 6 is a top view of the embodiment of FIG. 3.

Another advantage of the spaced location of the cab 12 relative to the body portion 14 of the combine 10 is that it allows a platform 40 (see FIGS. 2–4 and 6) to be positioned between the cab 12 and the body 14. In the embodiment shown in FIGS. 2–4 and 6, the platform 40 extends substantially around the back wall 36 and the first and second side walls 26, 28 of the cab 12. The platform 40 may be comprised of a single structure or may be comprised of various sections depending upon the particular application. In addition, the shape and configuration of the platform 40 may vary depending upon the particular application. In the embodiment shown in FIGS. 4 and 6, for example, the platform 40 includes a first side portion 42, a second side portion 44, and a back portion 46. The first and second side portions 42, 44 of the platform 40 may each preferably include a guard railing 43 extending upward from the first and second side portions 42, 44 along portion of an outer perimeter 45 of the first and second side portions 42, 44. In the embodiment shown, the back portion 46 of the platform 40 includes a pair of step portions 48 located at opposite ends of the back portion 46. The platform 40 may be mounted to the frame of the combine 10 or any of the various support structures of combine 10. For example, in the embodiment shown in FIG. 7, the side portion 42 of the platform 40 is mounted to and supported by a first horizontally oriented support member 50. Similarly, the second side portion 44 of the platform 40 is mounted to and supported by a second horizontally oriented support member 52. In the embodiment shown, the first support member 50 is substantially parallel to the second support member 52.

Figure 7:
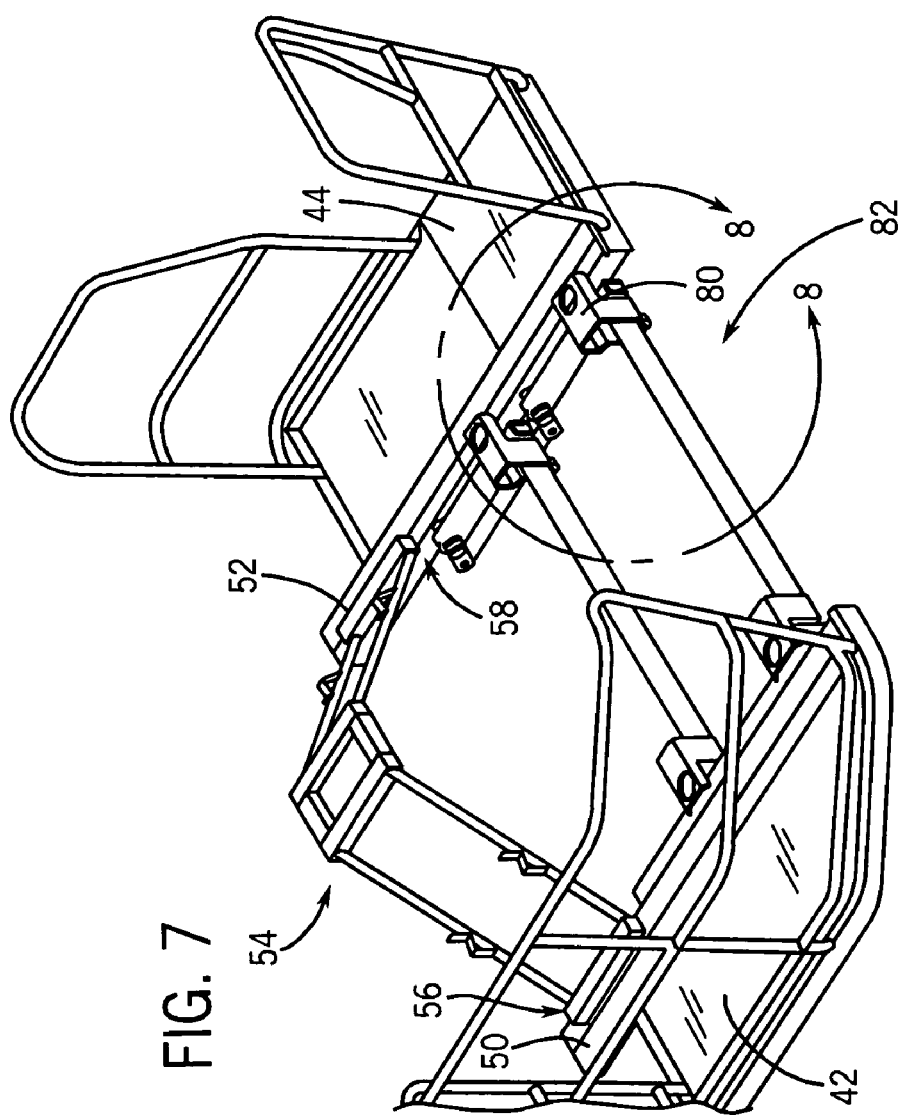
FIG. 7 is a perspective view of a preferred embodiment of the platform with the back portion removed and the linkage assembly shown in the down position.
Figure 8:
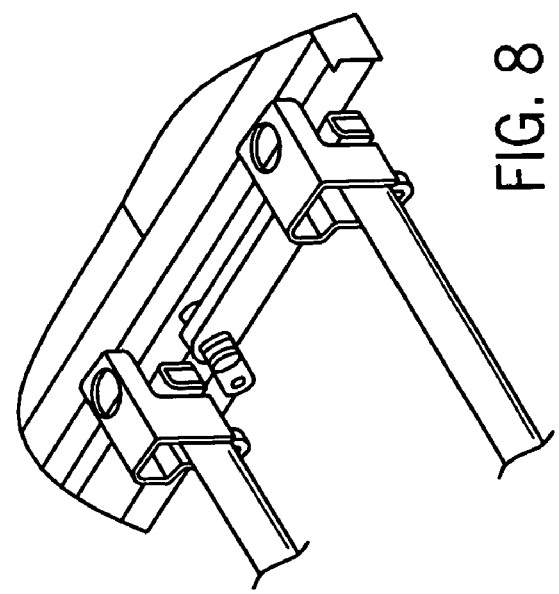
FIG. 8 is an enlarged view of the circled region of FIG. 7.

Referring to FIG. 7, a bridge member 54 has a first end portion 56 connected to the first support member 50 and a second end portion 58 connected to the second support member 52. The back portion 46 of the platform 40 may preferably be releasably attached to the bridge member 54. The first support member 50 is attached to a first vertical frame portion 55 (see FIG. 3) of the combine 10 and the second support member 52 is attached to a second vertical frame portion 57 (see FIG. 2) of the combine 10. The first and second support members 50, 52 and the platform 40 may preferably extend above the two front wheels 60, 62 of the combine 10 (see FIGS. 2–3).

Referring to FIGS. 2–3, the cab 12, the body 14, and the platform 40 define a passageway 70. In the embodiment shown, the passageway 70 is formed between the back wall 36 of the cab 12, the back portion 46 of the platform 40, and a front wall 29 of the housing 16. The width of the passageway 70, as defined by the distance (designated as A in FIG. 2) between the back wall 36 of the cab 12 and the front wall 29 of the housing 16, may preferably be approximately 18–20 inches. The back portion 46 of the platform 40 is positioned between the back wall 36 of the cab 12 and the front wall 29 of the housing 16 and may preferably have a width (designated as B in FIG. 6) of approximately 18–20 inches. Accordingly, the platform 40 and the passageway 70 allow an operator to walk along the platform 40 through the passageway 70 directly behind the cab 12 to visually monitor and access the various operating equipment of the combine 10 from the platform 40.

Figure 9:
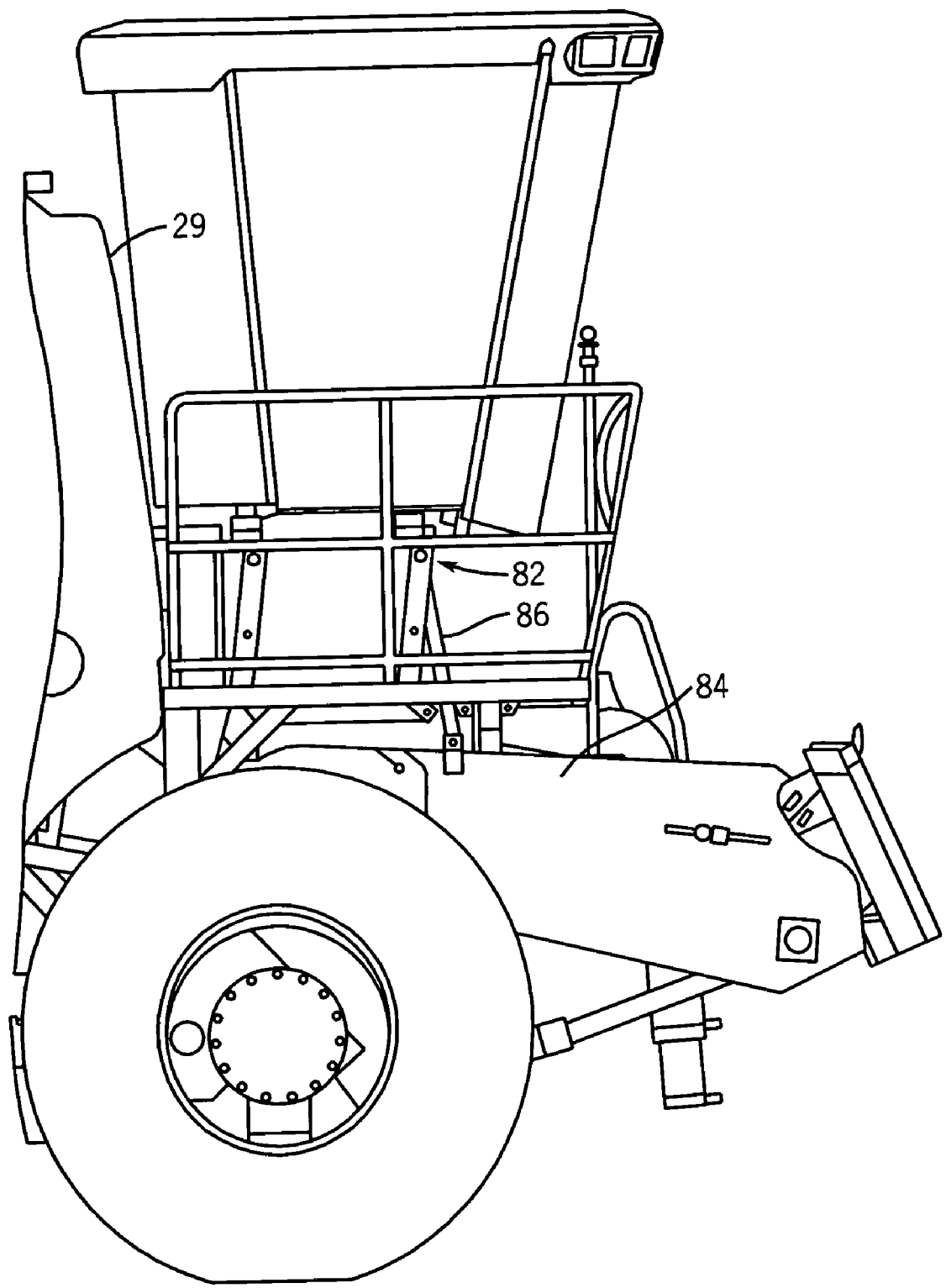
FIG. 9 is a side view of the embodiment of FIG. 3 showing cab in the up position.
Figure 12:
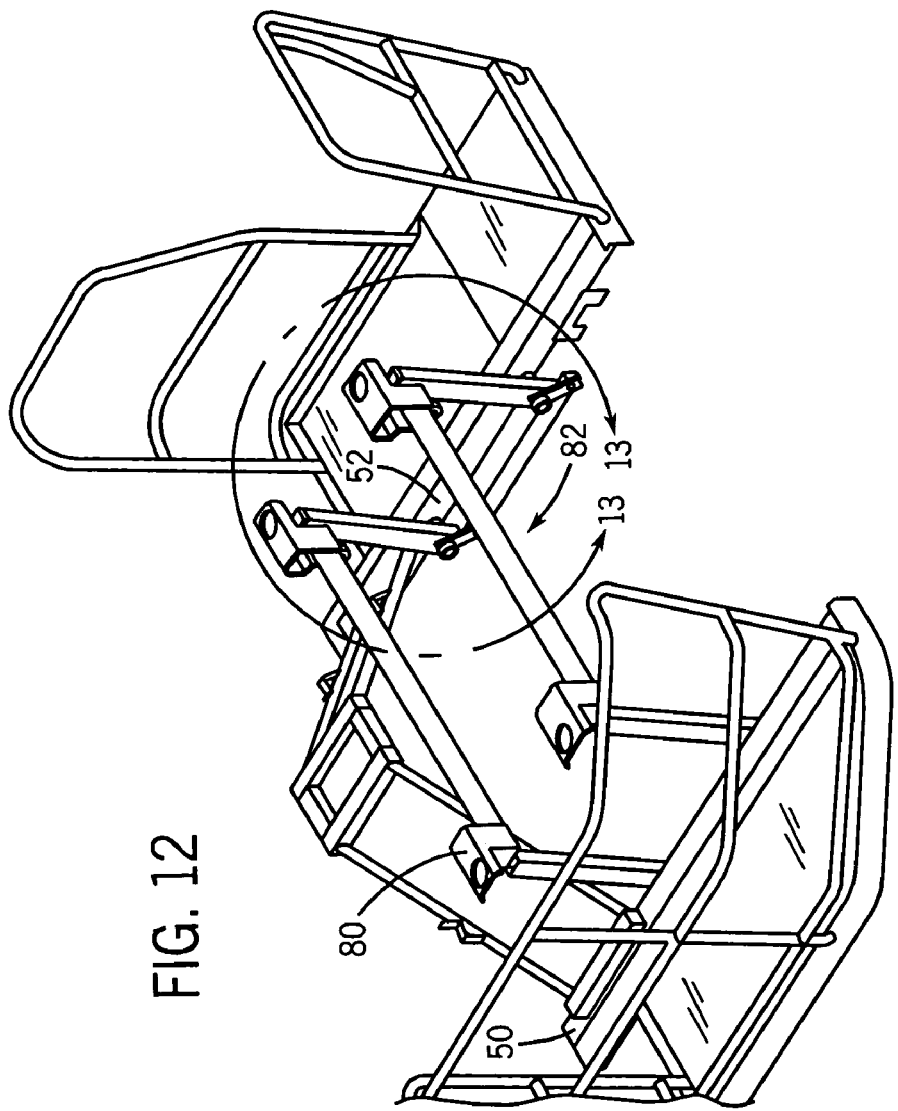
FIG. 12 is a perspective view of the embodiment of FIG. 7 showing the linkage assembly in an up position.

Referring to FIGS. 7 and 12, and the cab 12 is mounted to a plurality of cab support mounts 80. The cab support mounts 80 are in turn connected to a linkage assembly 82. The linkage assembly 82 is rotatably connected to the first and second support members 50, 52. The linkage assembly 82 may be any conventional linkage assembly such as, for example, a four bar linkage, that allows the cab 12 to be raised and lowered. FIG. 12 shows the linkage assembly 82 in the up position. The linkage assembly 82 may be raised or lowered by any conventional means such as for example, a conventional hydraulic cylinder that provides hydraulic pressure. The linkage assembly 82 may also be raised and lowered with a ball screw or worm-gear drive. Alternatively, as shown in FIGS. 3 and 9, the linkage assembly 82 may be coupled to the feeder housing 84 of the combine 10 with a removable support rod 86. In this manner, the up and down movement of the feeder housing 84 may be used to raise or lower the linkage assembly 82. There are several advantages associated with being able to raise and lower the cab 12. In particular, an operator can adjust the height of the cab 12 relative to the remainder of the combine 10 to improve the operator's comfort and vision. Moreover, the cab 12 can be lowered to the down position for shipping and storage of the combine 10. Finally, the linkage assembly 82 provides a means to raise the cab 12 to facilitate the installation and removal of the rotor 22 underneath the cab 12 through a front end portion 31 of the body 14 (see FIG. 1).

Figure 10:
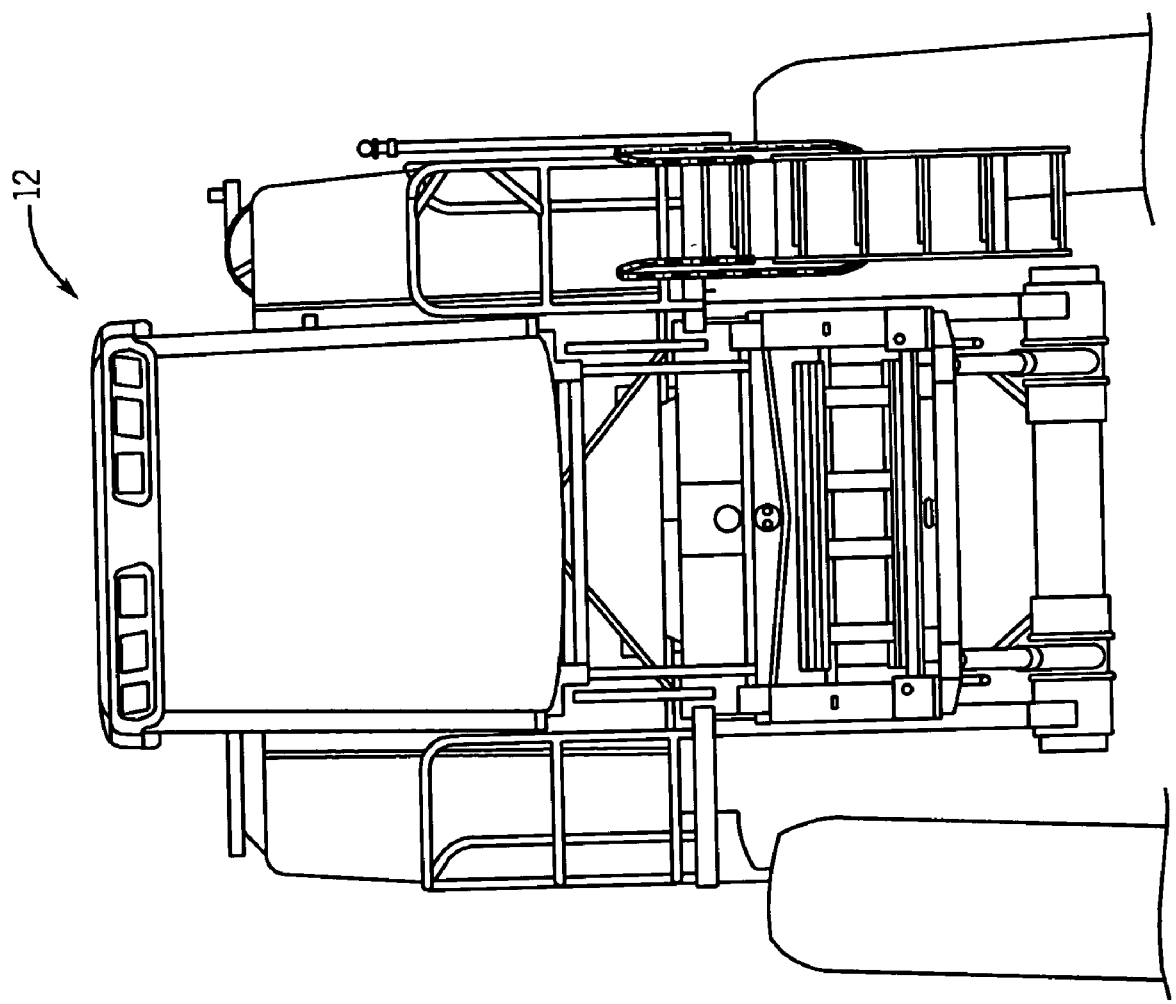
FIG. 10 is a front view of the embodiment of FIG. 5 showing the cab in the up position.
Figure 11:
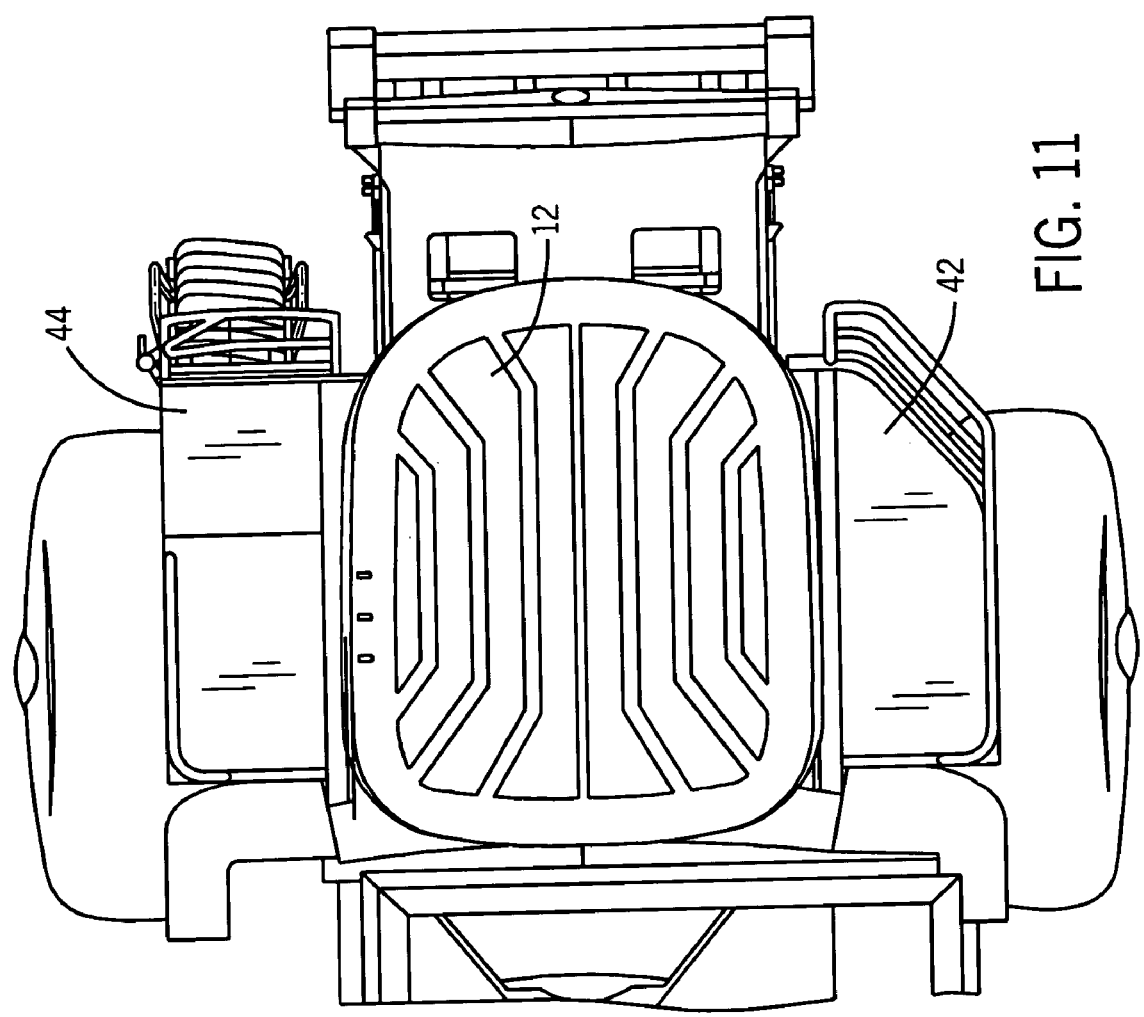
FIG. 11 is a top view of the embodiment of FIG. 9.
Figure 13:
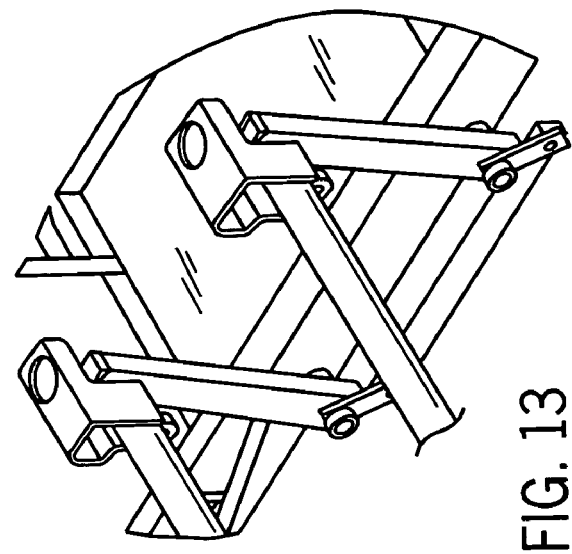
FIG. 13 is an enlarged view of the circled region of FIG. 12.

To install the rotor 22 through the front portion 31 of the body 14, the cab 12 is raised to the up position (see FIGS. 9–11). As shown in FIGS. 9 and 11, when the cab 12 is being raised, the rotational movement of the linkage assembly 82 causes the cab 12 to move in a backward direction toward the front wall 29 of the housing 16. As a result, the back portion 46 of the platform 40 may preferably be removed from the bridge member 54 so that he back portion 46 does not interfere with the movement of the cab 12. When the cab 12 is in the up position, the rotor 22 is installed through the front end portion 31 of the body 14 underneath the cab 12. When the rotor 22 is installed, the cab 12 may then be lowered to the desired operating height. The back portion 46 of the platform 40 may then be reattached to the bridge member 54.

To remove the rotor 22 through the front end portion 31 of the body 14, the cab 12 is raised to the up position (see FIGS. 9–11). Again, the back portion 46 of the platform 40 may preferably be removed so that it does not interfere with the movement of the cab 12. When the cab 12 is in the up position, the rotor 22 is removed through the front end portion 31 of the body 14 underneath the cab 12.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A harvesting combine comprising:
a body including a housing extending longitudinally along, and relative to, a forward direction of travel of the harvesting combine, the housing having a front wall extending generally transverse to the longitudinally extending body and a rotary threshing assembly including a rotor having a front end located in front of thy front wall;
a longitudinally extending cab in front of and spaced-apart from the front wall, the longitudinally extending cab having at least one longitudinally extending side; and
a platform comprising a rear platform portion, the rear platform portion positioned in the space between the cab and the body, the rear platform portion extending along the front wall, which is generally transverse to the longitudinally extending body, wherein the cab, the body, and the rear platform portion define a passageway to allow an operator to visually monitor and access the body from the platform, the passageway and the rear platform portion extending over the front end of the rotor, the platform further including at least one side platform portion connected to the rear platform portion, the at least one side platform portion located beside, and extending along, the at least one longitudinally extending side of the cab, wherein the rear platform portion and the at least one side platform portion comprise at least one generally L-shape embodiment when viewed from above, wherein the rear platform portion is supported on a bridge which has a generally inverted U-shape which extends over and defines a space containing the front end of the rotor, and wherein the rear platform portion is removably attached to the bridge to allow the cab to be positioned in the passageway above the front end of the rotor, wherein the cab is supported on the combine by a linkage assembly movable for moving the cab upwardly and rearwardly into the passageway and adjacent to the front wall, wherein the linkage assembly is coupled to a feeder housing of the combine with a removable support rod so that the up and down movement of the feeder housing causes the linkage assembly to at least one of raise and lower.

2. The apparatus of claim 1, wherein the rear platform portion between the cab and the body is located at a higher elevation than the at least one side platform portion.

3. The apparatus of claim 2 wherein the bridge supports at least one step at an elevation between the rear platform portion and the at least one side platform portion.

4. The apparatus of claim 3 comprising two of the at least one side platform portions beside opposite longitudinally extending sides of the cab, respectively, the side platform portions and the rear platform portion together having a U-shape when viewed from above.

5. The apparatus of claim 4 wherein the cab includes a hack wall, the back wall including a transparent window to provide the operator with enhanced visibility behind the cab.

6. The apparatus of claim 1, wherein the passageway has a width of approximately 18–20 inches.

7. The apparatus of claim 1 wherein the platform includes a railing extending upward from the platform and along an outer perimeter of the platform.

8. The apparatus of claim 1 wherein the combine includes a frame, the platform being attached to the frame.

9. The apparatus of claim 1 wherein the platform is positioned above two front wheels of the combine.

10. The apparatus of claim 1 wherein the cab includes a curved transparent front panel.

11. The apparatus of claim 10 wherein the curved transparent front panel is comprised of glass.

12. The apparatus of claim 1 wherein the body includes a housing and operating equipment.

13. The apparatus of claim 12 wherein the operating equipment includes a loop elevator assembly and a grain tank.

14. A method for operating a harvesting combine comprising:
providing a harvesting combine including a longitudinally extending body, relative to a forward direction of travel of the harvesting combine, the body including a housing, a feeder housing and operating equipment including at least a grain tank, a longitudinally extending cab spaced-apart from and in front of the body, the longitudinally extending cab having at least one longitudinally extending side, a platform including at least one side platform portion positioned beside the cab and extending along the at least one longitudinally extending side of the cab, and an elevated back platform portion connected to the at least one side platform portion and positioned between the cab and the body at an elevation higher than the side platform portion, wherein the cab, the body, and the elevated back platform portion define a passageway, wherein the cab is supported on the combine by a linkage assembly movable for moving the cab upwardly and rearwardly into the passageway;
removably detaching the back platform portion from the bridge;
coupling the linkage assembly to the feeder housing of the combine with a removable support rod so that up and down movement of the feeder housing causes the linkage assembly to at least one of raise and lower; and raising the feeder housing to raise the cab upwardly to position the cab in the passageway above the front end of the rotor.

15. A method far operating a harvesting combine comprising:
providing a harvesting combine including a longitudinally extending body, relative to a forward direction of travel of the harvesting combine, the body including a housing, a feeder housing and operating equipment including a grain rank, a longitudinally extending cab spaced-apart from and forwardly of the body, the longitudinally extending cab having at least one longitudinally extending side, a platform including at least one side platform portion positioned beside the cab and extending along the at least one longitudinally extending side of the cab, and an elevated back platform portion connected to the at least one side platform portion and positioned between the cab and the body wherein the cab, the body, and the elevated back platform portion define a passageway, wherein the cab is supported on the combine by a linkage assembly movable for moving the cab upwardly and rearwardly into the passageway;
releasably detaching the back platform portion from the bridge;
coupling the linkage assembly to the feeder housing of the combine with a removable support rod so that the up and down movement of the feeder housing causes the linkage assembly to at least one of raise and lower; and
raising the linkage assembly to position the cab in the passageway above the front end of the rotor to facilitate at least one of installation of the rotor and removal of the rotor.

16. The method of claim 15 wherein the cab includes a back wall, the back wall including a transparent window; and
visually monitoring the operating equipment from the cab.

17. The method of claim 16 wherein the transparent window is comprised of glass.

18. A cab arrangement for a harvesting combine comprising;
a harvesting combine including a longitudinally extending body, relative to a forward direction of travel of the harvesting combine, having a grain tank and a feeder housing;
a longitudinally extending cab spaced-apart from the grain tank, the longitudinally extending cab having opposite longitudinally extending sides; and
a platform including side platform portions beside opposite sides of the cab and extending longitudinally therealong, the platform further including a back platform portion connected to at least one of the side platform portions and positioned at a higher elevation than the side platform portions positioned between the cab and the grain tank, wherein the back platform portion is supported on a bridge which has a generally inverted U-shape which extends over and defines a space therebeneath containing a front end or a rotor of a threshing system of the combine extending forwardly of the body of the combine, wherein the back platform portion is releasably attached to the bridge to allow the cab to be positioned in the passageway above the front end of the rotor, and wherein the cab, the grain tank, and the back platform portion define a passageway to allow an operator to visually monitor operating equipment from the higher elevation, wherein the cab is supported on the combine by a linkage assembly movable for moving the cab upwardly and rearwardly into the passageway, wherein the linkage assembly is coupled to the feeder housing with a removable support rod so that the up and down movement of the feeder housing causes the linkage assembly to at least one of raise and lower.

* * * * *